March 4, 1958
W. TRAUTNER
2,825,887
VEHICULAR SIGNAL
Filed Oct. 28, 1950
2 Sheets-Sheet 1
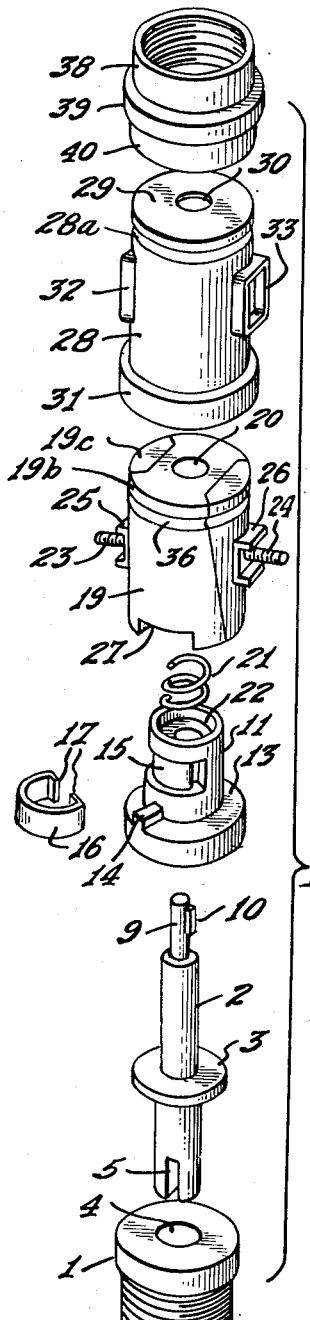
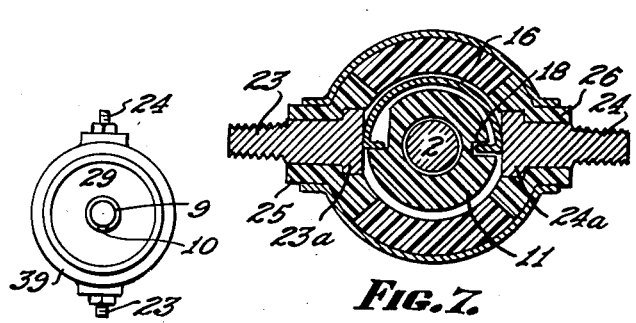
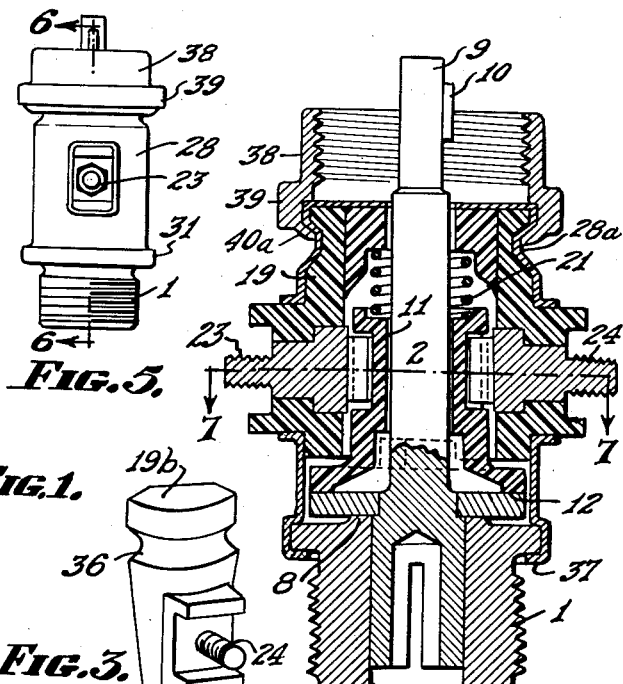
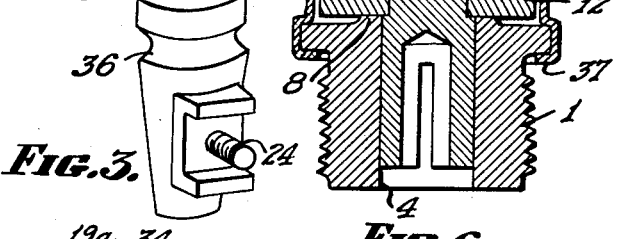
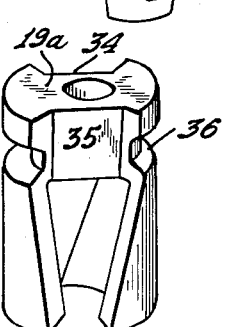
INVENTOR.
WAGN TRAUTNER,
BY
Allen & Allen
ATTORNEYS.

March 4, 1958     W. TRAUTNER     2,825,887
VEHICULAR SIGNAL
Filed Oct. 28, 1950                                  2 Sheets-Sheet 2
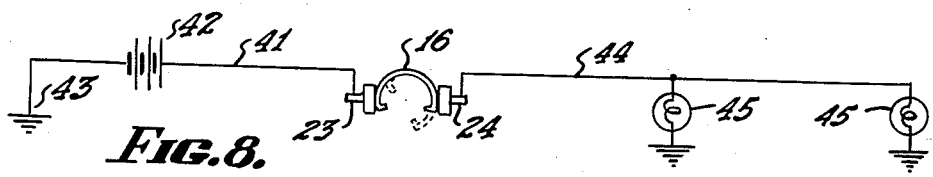
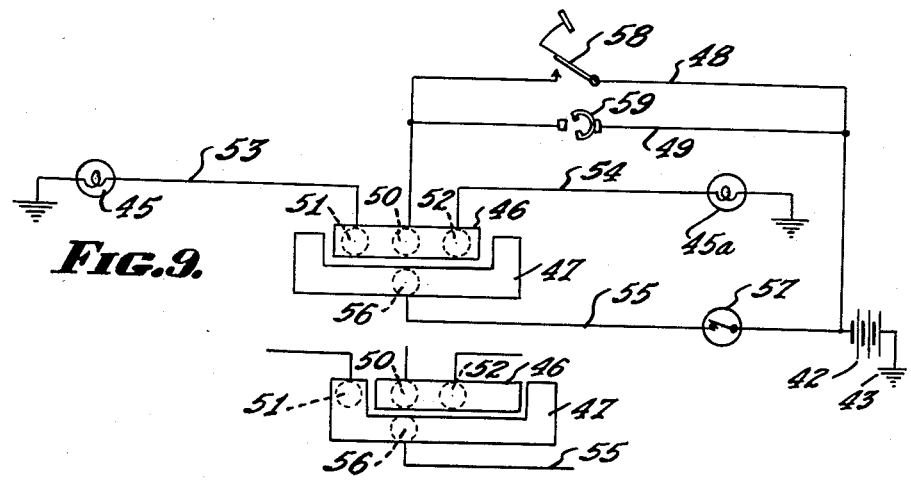
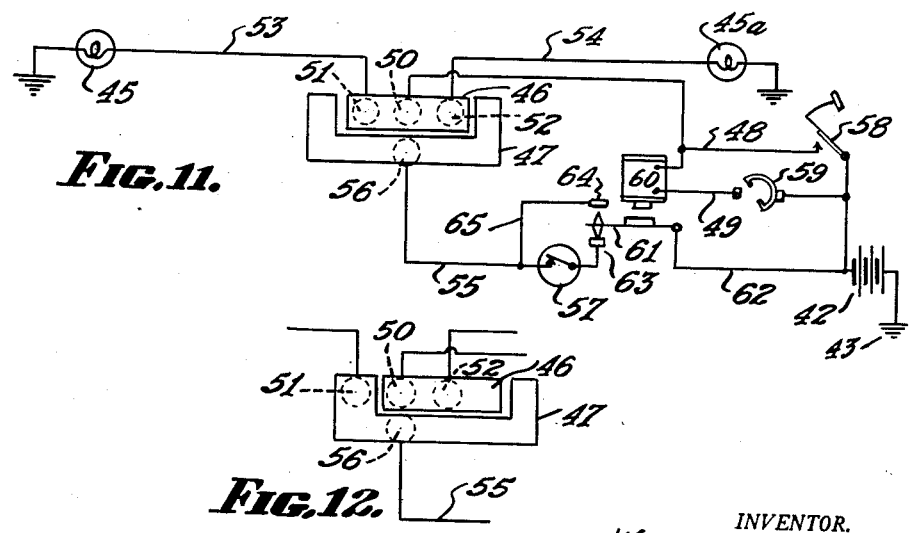
INVENTOR.
WAGN TRAUTNER,
BY
Allen & Allen
ATTORNEYS.

United States Patent Office 2,825,887
Patented Mar. 4, 1958

2,825,887

VEHICULAR SIGNAL

Wagn Trautner, Cincinnati, Ohio

Application October 28, 1950, Serial No. 192,693

2 Claims. (Cl. 340—52)

My invention relates to automatically operating signal and illumination means especially for motor vehicles; and I shall describe it in connection with a particular embodiment having to do with the provision of what I shall herein term a "back-up signal."

By the term "back-up signal" I mean to include not only such means as will give to an observer outside the vehicle an indication that the vehicle has reversed its motion, but also such automatically acting illuminating means on the rear of the vehicle as will enable the driver to see objects behind the vehicle at such time as he is driving the vehicle in reverse. The need for such means, generally included by me in the term "signal," has hitherto been realized and in some instances met by installations on new automotive equipment. However, many vehicles now in use lack such means, and it is one of the objects of the invention to provide a back-up signal applicable to old as well as to new equipment.

It is an object of my invention to provide a back-up signal which is inexpensive in first cost and inexpensive and simple to install, not only during the assembly of automotive vehicles but on those vehicles which are already in service.

More specifically, it is an object of this invention to provide an automatically acting back-up signal switch which is inexpensive to produce and which can very cheaply be installed in motor vehicles without in any way changing the construction of such vehicles.

Yet again, it is an object of my invention to provide a back-up signal system which can readily be combined where desired with other signalling systems of the vehicle such as the stop signal, the turn indicator or both, and which can if desired employ the same signal lights.

These and other objects of the invention, which will be set forth hereinafter or will be apparent to one skilled in the art upon reading these specifications, I accomplish by that construction and arrangement of parts of which I shall now describe certain exemplary embodiments. Reference is made to the accompanying drawings wherein:

Figure 1 is an exploded perspective view of the parts going to make up my switch structure.

Figure 2 is a perspective view of one part of my insulative switch body.

Figure 3 is a perspective view of another part thereof.

Figure 4 is a top plan view of the switch assembly.

Figure 5 is an elevational view thereof.

Figure 6 is a longitudinal cross-section of the switch assembly taken along the section line 6—6 of Figure 5.

Figure 7 is a transverse cross-sectional view of the assembly taken along the section line 7—7 of Figure 6.

Figure 8 is a wiring diagram showing one mode of use of my back-up switch.

Figure 9 is a wiring diagram showing one way in which my back-up switch may be connected into a signaling system inclusive of stop signal means and turn signal means.

Figure 10 is a fragmentary diagram related to Figure 9, but showing the turn signal indicator switch parts in a different position.

Figure 11 is a diagram showing another mode of employing my turn signal switch in a system including other signaling means.

Figure 12 is a fragmentary diagram related to Figure 11 and showing the turn signal switch parts in a different position.

In attaining the objects set forth above, I have developed an inexpensive and positively acting switch means designed for connection with the speedometer cable of an automotive vehicle. As is well known, the speedometer cable, which is a flexible shaft within a sheath, is arranged for connection at the transmission with a rotating member thereof which turns with the driven wheels of the vehicle at such a speed relationship as to permit the speedometer assembly to give a correct indication of the speed of the vehicle and the forward direction and of the mileage as determined by the rotation of the driven wheels, irrespective of the specific engine speed. Thus the transmission casing is normally provided with an aperture surrounded by an internally threaded boss. The rotating part mentioned above is accessible through the perforation. The sheath of the speedometer cable terminates in an externally threaded rotatable element which can be screwed into the boss, and connection between the flexible shaft of the speedometer cable and the rotative element is effected through a suitable connection, as by tongue-an-slot engagement or otherwise. My back-up switch element is a small device which in installation requires only the disconnection of the speedometer cable, the threaded insertion of my switch in the transmission boss aforesaid, the threaded connection of the speedometer cable to my device, and the provision of an appropriate wiring circuit.

I shall now proceed with the description of my switch mechanism. As shown in Figures 1–7, I provide a perforated externally threaded nipple 1 for insertion in the threaded boss of the transmission. A switch shaft 2 is provided carrying intermediate its ends a non-rotative frictional driving washer or disc 3. The lower end of the shaft 2, which in the assembled device will lie within the perforation 4 of the nipple 1, may be slotted, as at 5, and counterbored, as shown most clearly in Figure 6, for connection with the rotatable member of the transmission mentioned above. The upper surface of the nipple 1, where it comes into contact with the under surface of the disc 3, may be provided with an upstanding, thin, annular ridge 8 to minimize friction since the shaft and hence the disc will be driven while the nipple will remain stationary. The upper end of the shaft 2 will be provided with suitable means for connection to the flexible shaft of the speedometer cable. I have shown a shaft extension 9 of reduced diameter provided with a key 10. It will be understood that my invention is not limited to any particular form of means on the ends of the shaft 2 whereby the shaft may be connected to the rotatable part of the transmission and to the flexible shaft of the speedometer cable.

In my switch a perforated, rotatable, insulative member 11 surrounds the upper part of the shaft 2. This element has a lower surface 12 (Figure 6) which rests upon the disc 3 so that as the shaft rotates, it will tend to drive the member 11. The lower portion of the insulative member 11 is of larger diameter than the upper portion providing a shoulder 13. At one point on this shoulder I provide an upstanding lug 14, the purpose of which will hereinafter be described.

The upper or reduced portion of the insulative member 11 is further provided with a recess 15 of semi-circular form. The purpose of this recess is to accept a semi-circular contact spring element 16 with inwardly bent ends 17, One or both end portions of the semi-circular recess 15 may be provided with inwardly extending grooves such as the groove 18 in Figure 7 to accept one or both of the bent-over ends 17 of the spring metal contact element.

The reduced upper end of the member 11 is, in the assembled switch, positioned within the hollow interior of an insulative casing indicated generally at 19 in Figure 1. The upper part of this casing is closed excepting for a perforation 20 of a size to accept the shaft 2 so that an internal shoulder is provided within the casing. A coiled compression spring 21 engages between this shoulder and the bottom of an annular recess 22 formed in the upper end of the member 11, as will be clear from Figure 6. The purpose of the spring 21 is to urge the member 11 downwardly so that its lower surface is held in frictional contact with the disc 3.

The casing 19 is provided at opposite sides with terminal members 23 and 24 to which electrical leads may be attached. Preferably the casing has bosses 25 and 26 adjacent the terminal members.

The lug 14 of the member 11 previously described rides in a slot 27 in the lower end of the insulative casing 19. This results in a limitation of the rotation of the member 11 by contact of the lug 14 with either end of the slot 27, and also fixes the positions of the member 11 when the shaft 2 is rotating in either direction. As will readily be understood, when the rotation of the member 11 has been so stopped, the under surface 12 of it will merely slip with respect to the driving surface of the disc 3.

The terminal elements 23 and 24 extend through wall portions of the insulative casing 19 to the interior surface thereof, and, there, are provided with contact buttons or heads 23a and 24a. The arrangement is such that when the shaft 2 is driven in one direction by a reverse motion of the rotative member of the transmission, the contact spring element 16 will occupy the position shown in Figure 7 and will bridge across between the contact heads 23a and 24a, establishing an electric circuit between them. When the shaft 2, however, is driven in the opposite direction, as by forward movement of the rotative element of the transmission, the member 11 will be moved to a new position determined by the slot 27. In this new position the contact spring element 16 will remain against one of the contact heads 23a or 24a, but will be out of contact with the other, thus breaking the electrical circuit between them. The terms "reverse" and "forward" used in this paragraph refer to the modes of motion of the rotative element of the transmission when the driven vehicle wheels are turning in the forward or reverse direction. It will be evident that the operation of my device as a switch will be automatic depending upon the direction of motion of the vehicle. The circuit between terminals 23 and 24 will be closed whenever the vehicle is moving in a reverse direction, but will be broken whenever the vehicle is moving in a forward direction. If the terminals 23 and 24 are now connected in circuit with a source of power and a signaling means, an automatic back-up signal will be given.

A metallic housing 28 of generally cylindrical shape is provided for my switch. The top of the housing is closed, as at 29, except for an opening 30 to permit passage of the upper end of the shaft member 2. The lower end of the housing is provided with a bell 31 having an internal diameter to accept the head of the nipple 1 in a press fit so that the nipple will be non-rotative with respect to the housing. The housing body is perforated at opposite sides to permit passage of the terminal elements 23 and 24 and their adjacent insulative bosses 25 and 26, and the perforations may be provided with upstanding peripheral flanges indicated at 32 and 33 for the protection of the insulative bosses.

With the terminals and bosses projecting beyond sides of the insulative casing 19, it will be seen that the casing could not be inserted axially into the metallic housing 28 in which it is designed to have a relatively close fit. To avoid the difficulty inherent in this, I form my insulative casing 19 in three parts. There is a main body part 19a (Figure 2), side portions of which are recessed or cut away, as indicated at 34 and 35. I provide also supplementary casing portions 19b and 19c (one of which is illustrated in Figure 3). These portions each contain one of the terminal elements 23 or 24 and are so shaped that when fitted into the recesses 34 and 35 of the body portion 19a, they will complete the insulative housing in the form shown at 19 in Figure 1.

Now it becomes possible to assemble the casing 19 to the housing 28 by first inserting the casing portions 19b and 19c into the housing and passing their respective terminal and boss portions outwardly through the lateral holes in the housing. After this, the casing element 19a is inserted into the housing axially and between the elements 19b and 19c, the recesses 34 and 35 being tapered downwardly to facilitate this action. I prefer to fasten the parts of the casing 19 together and the combined casing in the housing; and to this end I provide a concurrent groove 36 near the upper ends of the elements 19a, 19b and 19c, and after the assembly of these elements within the housing, I upset wall portions of the housing into the groove, as most clearly shown at 28a in Figure 6. The upsetting forms preferably a continuous groove adjacent the upper portion of the housing and indicated also at 28a in Figure 1.

As previously indicated, the head portion of the nipple 1 is given a press fit within the flange of the bell 31 of the housing. The flange of the bell is made wider than the depth of the head of the nipple, and is thereafter flanged over or upset against the under side of the nipple head, as shown at 37 in Figure 6.

As a final part of my structure, I provide a hollow fitting having an internally threaded body 38, a rim 39 and a depending flange 40. The flange has an internal diameter such that it will fit over the upper end of the housing 28, whereupon the flange may be upset, as at 40a in Figure 6, into the groove 28a so as to hold the fitting and the housing together. The upsetting may be done in such a way as to fix the fitting non-rotatably to the housing; but in instances where rotation of the fitting is required for proper connection to the speedometer cable, the fitting may be left rotatable but non-detachable from the housing, as will be readily understood. The assembled relationship of the several parts will be clear from the foregoing description and from Figure 6.

The entire switch is small, simple and self-contained, as will be evident from Figures 4 and 5.

Figure 8 shows a circuit within which my switch may be employed. One of the terminals, such as the terminal 23, may be connected by a lead 41 to the storage battery 42 of the automotive vehicle, the opposite terminal of the battery being grounded as at 43. The other terminal 24 of the switch may be connected by a lead 44 to a terminal of one or more lamps 45, the opposite terminals of which are grounded as in standard practice. When the vehicle is being driven in the forward direction, the contact spring element 16 will occupy the position shown in dotted lines in Figure 8; there will be no electrical connection between the terminals 23 and 24; and there will be no energization of the lamps or bulbs 45. When, however, the vehicle reverses its motion, the contact spring element 16 will move automatically to the position shown in solid lines, connecting the terminals 23 and 24, and completing the circuit of the bulbs 45 and causing them to be energized. The bulb or bulbs 45 may be contained in one or more lamp housings on the vehicle, used only for the purpose of a back-up signal and illumination during reverse movement of the vehicle, if desired.

The expense of providing special lamps and lamp housings for a back-up signal is not usually justified. Most motor vehicles in addition to a tail lamp are provided with one or more stop signal lamps connected to the vehicle battery through a stop signal switch actuated by or in connection with the brake pedal. In order clearly to distinguish the signal given by the stop light or lights from the tail light of the vehicle, the stop light element bulbs are ordinarily made to consume a greater wattage and give a more brilliant light. Even though the light is emitted through a red filter, in most instances the actual illumination provided by the stop signal lamp or lamps will be found sufficient for visibility when backing in the dark. Thus in installing my back-up switch in most vehicles, it is necessary only to couple it in parallel with the stop signal switch in the circuit of the latter so that the stop signal light or lights can be energized through either switch.

Many vehicles are also equipped with turn signals means utilizing the same two bulbs (one on each side of the rear of the vehicle), as are employed for the stop signal. My structure lends itself readily to connection into systems of this character. Referring to Figure 9, the index numerals 46 and 47 indicate the movable brushes of the turn signal indicator switch. The vehicle battery 42, grounded as before at 43, is connected through parallel leads 48 and 49 to a contact button 50 of the turn signal indicator switch. This contact button remains at all times in contact with some portion of the movable brush 46. When the turn signal indicator switch is in the neutral position, as illustrated in Figure 9, the brush 46 serves to connect the contact button 50 with other contact buttons 51 and 52 connected respectively by leads 53 and 54 to the bulbs 45 and 45a, the other terminals of which are grounded. There is also a connection from the battery 42 by means of a lead 55 to a contact button 56 remaining at all times in contact with the brush 47. The lead 55 includes a flasher device 57.

In the position of the parts shown in Figure 9, the turn indicator is inactive; but the bulbs 45 and 45a can be energized either as a stop signal through the brake switch 58 or as a back-up signal through my automatically acting back-up switch indicated in this figure by the numeral 59, these switches being respectively in the leads 48 and 49. Should the turn indicator switch be actuated in one direction, the brushes 46 and 47 will come into the position shown in Figure 10, the other parts of the circuit remaining as in Figure 9. Now it will be seen that the bulb 45 will flash intermittently because contacting button 51 has been connected by brush 47 to contact button 56 which is in the circuit of lead 55 containing the flasher 57. At the same time the contact button 50 remains connected to contact button 52 through brush 46 so that if the brake switch 58 or the back-up switch 59 were actuated, the bulb 45a would be illuminated steadily, giving the required signal.

An elaboration of the circuit of Figures 9 and 10 is illustrated in Figures 11 and 12 wherein like parts have been given like index numerals. Again, the stop switch 58 and back-up switch 59 are connected in parallel between the battery 42 and the contact button 50; but the circuit of the back-up switch contains the winding 60 of a relay. The relay has an armature element 61 connected by a lead 62 to the battery. The armature element will be biased by a spring or otherwise so that when the coil 60 is not energized, the armature will lie against and make contact with a contact element 63 whereas it will lie against and make contact with a contact element 64 when current flows through the coil 60. Contact element 63 is connected with contact button 56 of the turn indicator switch by the lead 55 containing the flasher or interrupter 57. The contact element 64 is connected by a lead 65 to the lead 55 in such a way as to bypass the interrupter 57.

Figure 11 shows the position of the parts when the turn signal switch is in the neutral position. As before, the bulbs 45 and 45a can be energized and caused to burn steadily by the closing either of the stop signal switch 58 or of the back-up signal switch 59. In Figure 12 the brushes 46 and 47 have been moved to one side by actuation of the turn signal switch. Contact button 51 is now connected to contact button 56 through brush 47, and bulb 45 will be energized intermittently through the flasher or interrupter 57, giving a turn signal (the other parts of the circuit arrangement of Figure 11 remaining as shown in that figure). If during the making of a turn the operator of the motor vehicle finds it necessary to apply the brakes, a signal will be given of this because bulb 45a will be caused to burn steadily by the closing of the stop signal switch 58, contact buttons 50 and 52 remaining in contact with each other through the brush 46. This stop signal will not affect the turn signal, as will be evident.

If, however, during the execution of a turn the operator of a motor vehicle should find occasion to stop and reverse his direction of motion so that he would no longer be executing the indicated turn, my automatically acting back-up signal switch 59 would close the circuit to bulb 45a causing this bulb to be illuminated in a steady fashion. At the same time coil 60 of the relay would be energized, swinging the armature structure 61 out of contact with element 63 and into contact with element 64. The result of this will be the steady energization of bulb 45 because the flasher or interrupter 57 is now bypassed. Thus, an observer would understand from the signal that the proposed or partially executed turn had been abandoned and the vehicle at least brought to rest, if not actually reversed, and this would be true in spite of the fact that the turn signal switch may still be in turn signal indicating position, the ordinary cancellation means therefor not having come into operation. In this way, I have succeeded in employing the same set of lights on the vehicle for the giving of three separate and distinctly intelligible types of signal and have succeeded in causing an automatically actuated back-up switch effectively to cancel the signal given by a turn signal indicator upon actual abandonment of the operator's initial plan and irrespective of the operation of the normal turn signal cancellation means (usually operated by the turning of the steering mechanism in the opposite direction). Turn signal indicators in the form of lights capable of flashing are ordinarily provided both at the front and rear of motor vehicles. The provision of front turn signal indicators does not constitute a limitation upon my invention; but it will be readily understood by those skilled in the art that these can easily be provided by establishing additional contacts to be engaged by the brush 47 so as to connect the front lights respectively and automatically in parallel with the bulbs 45 and 45a. When this is done, a front turn signal will also be canceled effectively by actual reversal of the vehicle.

Other circuit arrangements are possible for different purposes A substantial operating advantage in the operation of my back-up signal switch and system as contrasted with former systems in which a back-up light for illumination purposes is connected to a switch coupled with the transmission shift lever of a motor vehicle, lies in the fact that my structure does not provide a signal unless and until actual reverse motion of the vehicle is commenced, thus avoiding false signals.

Modifications may be made in my invention without departing from the spirit of it. Having thus described my invention in certain exemplary embodiments, what I claim as new and desire to secure by Letters Patent is:

1. In a motor vehicle having a transmission and a speedometer connected thereto by a cable, a pair of electrical signaling elements and a switch, said switch being a rotary slip switch having sliding contacts connected between the said speedometer and the said transmission and arranged to be moved to circuit closing position upon rearward motion of the vehicle and to circuit opening position upon forward motion of the vehicle, the said signaling elements being in circuit with said switch and a source of power and arranged to be connected together and disconnected through said switch, a stop switch actuated by the braking mechanism of said vehicle, said stop switch connected to said electrical signaling elements in parallel with said rotary slip switch, a turn signal switch means, said rotary slip switch being connected to said signaling elements through said turn signal switch means, said last mentioned switch means having contacts for applying to a disconnected one of said electrical signaling elements a discontinuous electrical actuation through a separate circuit containing an interrupter, there being the coil of a relay included in the circuit of said rotary slip switch, said relay having contact means for bypassing said interrupter when said coil is energized.

2. A signaling system for a vehicle comprising two rear lights one located at either side of the vehicle, a manually operated turn signal switch having a first member coacting with three contacts the outlying ones of which are connected respectively to said lights, said first member having three positions, a first position in which the outlying contact for the right hand lamp is connected to a central contact, a second position in which the three contacts are interconnected, and a third position in which the central contact and the outlying contact for the left hand one of said lamps are interconnected, said turn signal switch having a second member movable with said first member and acting in the first and third of said positions to make contact respectively with the contacts of said left hand and right hand lamps, a source of power having a circuit connection with said second member, said circuit connection including a flasher unit, a stop switch actuated by the braking mechanism of said vehicle in a parallel circuit from said source of power to said central contact, a rotary slip switch having sliding contacts connected to said vehicle in such fashion as to operate to close said contacts upon the occurrence of rearward motion of said vehicle, a parallel circuit including said rotary slip switch interconnecting said source of power and said central contacts, a double throw relay having a coil and an armature with opposed contacts, the said coil being located in said last mentioned parallel circuit, and said armature and the relay contact member engaged thereby being located in the circuit including said flasher unit interconnecting said source of power and said second member of said turn signal switch, the other of said relay contacts being connected in a branch circuit bypassing said flasher unit.

References Cited in the file of this patent
UNITED STATES PATENTS

| | | |
|---|---|---|
| 1,394,046 | Swaney | Oct. 18, 1921 |
| 1,469,337 | Sanborn | Oct. 2, 1923 |
| 1,475,296 | Godley | Nov. 27, 1923 |
| 1,846,513 | Douglas | Feb. 23, 1923 |
| 1,808,316 | Osgian | June 2, 1931 |
| 1,919,206 | Douglas | July 25, 1933 |
| 1,926,992 | Avato | Sept. 12, 1933 |
| 2,132,188 | Rockett | Oct. 4, 1938 |
| 2,141,210 | Foulks | Dec. 27, 1938 |
| 2,321,803 | Falge | June 15, 1943 |
| 2,602,849 | Lawson | July 8, 1952 |